United States Patent
Lin et al.

(10) Patent No.: US 11,057,115 B1
(45) Date of Patent: Jul. 6, 2021

(54) OPTICAL COMMUNICATION DEVICE

(71) Applicant: VisEra Technologies Company Limited, Hsin-Chu (TW)

(72) Inventors: Kuo-Feng Lin, Kaohsiung (TW); Chin-Chuan Hsieh, Hsin-Chu (TW)

(73) Assignee: Visera Technologies Company Limited, Hsin-Chu (TW)

( * ) Notice: Subject to any disclaimer, the term of this patent is extended or adjusted under 35 U.S.C. 154(b) by 0 days.

(21) Appl. No.: 17/039,644

(22) Filed: Sep. 30, 2020

(51) Int. Cl.
| | |
|---|---|
| *H04B 10/04* | (2006.01) |
| *H04B 10/50* | (2013.01) |
| *H04B 10/572* | (2013.01) |
| *G02B 6/42* | (2006.01) |
| *G02B 27/09* | (2006.01) |

(52) U.S. Cl.
CPC ......... *H04B 10/503* (2013.01); *G02B 6/4206* (2013.01); *G02B 6/4215* (2013.01); *G02B 27/0955* (2013.01); *H04B 10/572* (2013.01)

(58) Field of Classification Search
CPC .. H04B 10/503; H04B 10/572; G02B 6/4206; G02B 6/4215; G02B 27/0955; G02B 6/32; G02B 6/0006; G02B 6/0005; G02B 6/0013; G02B 6/0033; G02B 6/4204; H04J 14/04
USPC ............ 398/182, 200, 201, 140, 141, 88, 68
See application file for complete search history.

(56) References Cited

U.S. PATENT DOCUMENTS

| | | | |
|---|---|---|---|
| 2018/0172988 A1* | 6/2018 | Ahmed | .................... H01L 33/58 |
| 2020/0284883 A1* | 9/2020 | Ferreira | ................ G01S 7/4816 |
| 2021/0044748 A1* | 2/2021 | Hu | ..................... H04N 5/23238 |

* cited by examiner

*Primary Examiner* — Hibret A Woldekidan
(74) *Attorney, Agent, or Firm* — Muncy, Geissler, Olds & Lowe, P.C.

(57) ABSTRACT

An optical communication device includes a plurality of laser sources, a plurality of first meta-lenses, and an optical fiber. The laser sources transmit a plurality of laser beams in the same direction according to electrical signals. The laser beams have different wavelengths. The first meta-lenses receive the laser beams, and in a first substrate, refract the laser beams to a focal point to generate a mixed laser beam. The optical fiber receives the mixed laser beam for transmission. The focal point is arranged at the input end of the optical fiber.

14 Claims, 8 Drawing Sheets

OPTICAL COMMUNICATION DEVICE

FIELD OF THE INVENTION

The invention is related to an optical communication device, and it is especially related to an optical communication device having small size and meta-lens.

DESCRIPTION OF THE RELATED ART

In current optical communication system, an electrical-optical convertor transfers electrical signals to light signals with different wavelengths, and an optical multiplexer collects the light signals with different wavelengths and sends them to an optical fiber for transmission. Wavelength division multiplexing (WDM) is a method of using huge bandwidth of a low-loss area of a single-mode optical fiber to transmit different wavelengths of the light signals.

Optical fibers are classified as single-mode or multimode according to the diameter of their inner cores. A single-mode fiber allows propagation of only the lowest-order mode at one particular wavelength such as C-band, which has the lowest loss and is the most common band for long-haul digital communication. With the evolution of semiconductor process technology, how to shrink the size of optical communication system (including electrical-optical convertors and optical multiplexers) becomes an important topic.

BRIEF SUMMARY OF THE INVENTION

In order to resolve the issue described above, an embodiment of the invention provides an optical communication device. The optical communication device includes a plurality of laser sources, a plurality of first meta-lenses, and an optical fiber. The laser sources transmit a plurality of laser beams in the same direction according to electrical signals, and the laser beams have different wavelengths. The first meta-lenses receive the laser beams, and in a first substrate, refract the laser beams to a focal point to generate a mixed laser beam. The optical fiber receives the mixed laser beam for transmission, and the focal point is arranged at the input end of the optical fiber.

In the optical communication device described above, the optical communication device further includes a plurality of second meta-lenses. The second meta-lenses are arranged between the laser sources and the first meta-lenses, and refract the laser beams so that the beam profiles of the laser beams change from an oval to a circle.

According to the optical communication device described above, the wavelengths of the laser beams are between 1530 nanometers and 1565 nanometers.

According to the optical communication device described above, the distance between the first meta-lenses and the optical fiber is equal to the thickness of the first substrate.

According to the optical communication device described above, each of the first and second meta-lenses includes a plurality of cylinders, each of which has a different diameter.

According to the optical communication device described above, the distance between the first meta-lenses and the optical fiber is greater than the diameters of the first meta-lenses.

According to the optical communication device described above, the mixed laser beam is transmitted in a single-mode in the optical fiber.

According to the optical communication device described above, each of the first meta-lenses is designed individually, so that the refraction angles of the laser beams passing through the first meta-lenses will match the numerical aperture (NA) of the optical fiber.

According to the optical communication device described above, the optical communication device further includes a third meta-lens, a grating, and a plurality of fourth meta-lenses. The third meta-lens receives the mixed laser beam from the optical fiber, and parallelizes the mixed laser beam. The grating disperses the mixed laser beam to recover the laser beams with different wavelengths. The fourth meta-lenses receive the laser beams, and refract and focus the laser beams to a plurality of second optical fibers. The second optical fibers receive the respective laser beams with different wavelengths.

According to the optical communication device described above, each of the fourth meta-lenses is designed individually, so that the refraction angles of the laser beams passing through the fourth meta-lenses will match the numerical aperture (NA) of the second optical fibers.

According to the optical communication device described above, the laser sources are semiconductor lasers.

According to the optical communication device described above, the laser sources and the first and second meta-lenses are formed on a second substrate; the first and second meta-lenses are formed on the top surface of a buffer layer; and the buffer layer is between the first and second meta-lenses and the second substrate.

According to the optical communication device described above, the thickness of the buffer layer can be adjusted so that the height of the laser sources aligns with that of the first and second meta-lenses.

According to the optical communication device described above, the first substrate comprises a glass, and the second substrate comprises indium phosphide (InP), gallium arsenide (GaAs), gallium nitride (GaN), and sapphire.

According to the optical communication device described above, the first, second, and fourth meta-lenses, the third meta-lens, and the grating include a single crystal silicon, a polycrystalline silicon, an amorphous silicon, silicon nitride ($Si_3N_4$), gallium phosphide (GaP), titanium dioxide ($TiO_2$), aluminum antimonide (AlSb), aluminum arsenide (AlAs), aluminum gallium arsenide (AlGaAs), aluminum gallium indium phosphide (AlGaInP), boron phosphide (BP), or zinc germanium phosphide ($ZnGeP_2$).

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. The size of the components may be enlarged or reduced to provide clear illustration.

DETAILED DESCRIPTION OF THE INVENTION

Figure 1:
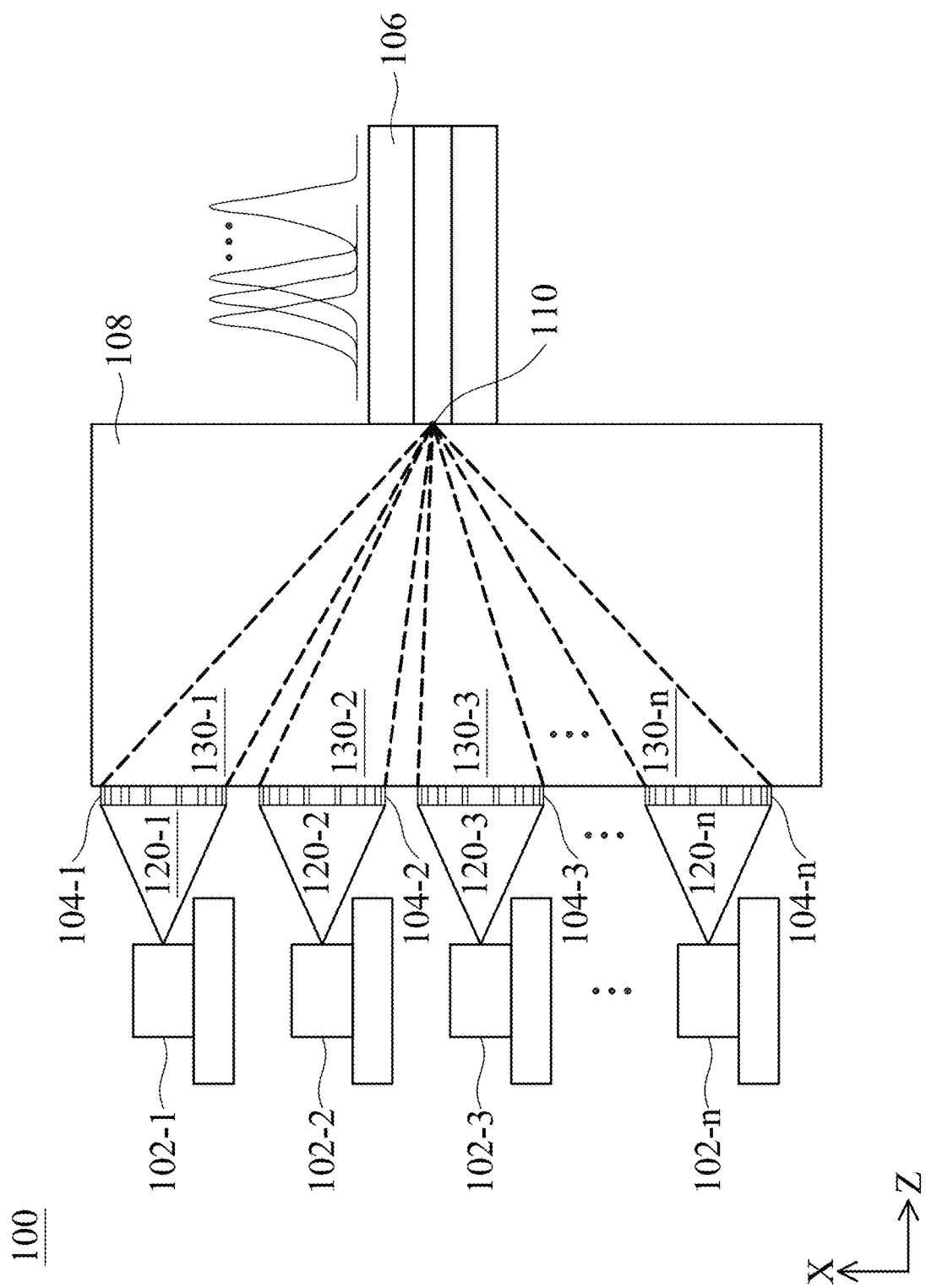
FIG. 1 is a schematic diagram of an optical communication device 100 in accordance with some embodiments of the disclosure.

FIG. 1 is a schematic diagram of an optical communication device 100 in accordance with some embodiments of the disclosure. As shown in FIG. 1, the optical communication device 100 includes a plurality of laser sources (such as laser sources 102-1, 102-2, 102-3, . . . , 102-n), a plurality of meta-lens (such as meta-lens 104-1, 104-2, 104-3, . . . , 104-n), a substrate 108, and an optical fiber 106. The laser source 102-1 transmits a laser beam 120-1 with a wavelength $\lambda_1$ to the meta-lens 104-1, the laser source 102-2 transmits a laser beam 120-2 with a wavelength $\lambda_2$ to the meta-lens 104-2, the laser source 102-3 transmits a laser beam 120-3 with a wavelength $\lambda_3$ to the meta-lens 104-3, and the laser source 102-n transmits a laser beam 120-n with a wavelength $\lambda_n$ to the meta-lens 104-n. In some embodiments, n is equal to 40, but the present invention is not limited thereto. The wavelengths $\lambda_1, \lambda_2, \lambda_3 \ldots \lambda_n$ are all in C-band. That is, the wavelengths $\lambda_1, \lambda_2, \lambda_3, \ldots, \lambda_n$ are between 1530 nanometers and 1565 nanometers. In some embodiments, C-band are averagely divided into 40 channels, so that the laser sources 102-1, 102-2, 102-3, . . . , 102-n (n=40) respectively generates the laser beams 120-1, 120-2, 120-3, . . . , 120-n, having different wavelengths between each other, in 40 channels.

In some embodiments, the laser sources 102-1, 102-2, 102-3, . . . , 102-n are semiconductor lasers, which transmit different wavelengths of laser beam according to different electrical signals. In other words, the laser sources 102-1, 102-2, 102-3, . . . , 102-n are able to transfer electrical signals to light signals (such as laser beams). The meta-lens 104-1 receives the laser beam 120-1 with a wavelength $\lambda_1$, refracts the laser beam 120-1 to form a focus laser beam 130-1 to a focal point 110 in the substrate 108. The meta-lens 104-2 receives the laser beam 120-2 with a wavelength $\lambda_2$, refracts the laser beam 120-2 to form a focus laser beam 130-2 to the focal point 110 in the substrate 108. The meta-lens 104-3 receives the laser beam 120-3 with a wavelength $\lambda_3$, refracts the laser beam 120-3 to form a focus laser beam 130-3 to the focal point 110 in the substrate 108. Similarly, the meta-lens 104-n receives the laser beam 120-n with a wavelength $\lambda_n$, refracts the laser beam 120-n to form a focus laser beam 130-n to the focal point 110 in the substrate 108. In some embodiments, the substrate 108 includes a glass, but the present invention is not limited thereto.

In some embodiments, the meta-lenses 104-1, 104-2, 104-3, . . . , 104-n are each designed individually, so that the refraction angles of the laser beams 120-1, 120-2, 120-3, . . . , 120-n correspondingly passing through the meta-lenses 104-1, 104-2, 104-3, . . . , 104-n will match the numerical aperture (NA) of the optical fiber 106. At the focal point 110, a mixed laser beam (not shown) is formed. In some embodiments, since the focal point 110 is arranged at the input end of the optical fiber 106, the mixed laser beam can be transmitted in the optical fiber 106. In some embodiments, the optical fiber 106 is a single-mode optical fiber with core diameters of 6-9 micrometers, so that the mixed laser beam is transmitted in a single-mode in the optical fiber 106. In some embodiments, the distance between the meta-lenses 104-1, 104-2, 104-3, . . . , 104-n and the optical fiber 106 is equal to the thickness of the substrate 108.

In FIG. 1, the laser sources 102-1, 102-2, 102-3, . . . , 102-n and the meta-lens 104-1, 104-2, 104-3, . . . , 104-n are arranged along an x direction. However, the laser sources 102-1, 102-2, 102-3, . . . , 102-n and the meta-lens 104-1, 104-2, 104-3, . . . , 104-n may also be arranged along the x direction and a y direction at the same time. In other words, the arrangement of the laser sources and the meta-lens is in three-dimension (3D).

Figure 2:
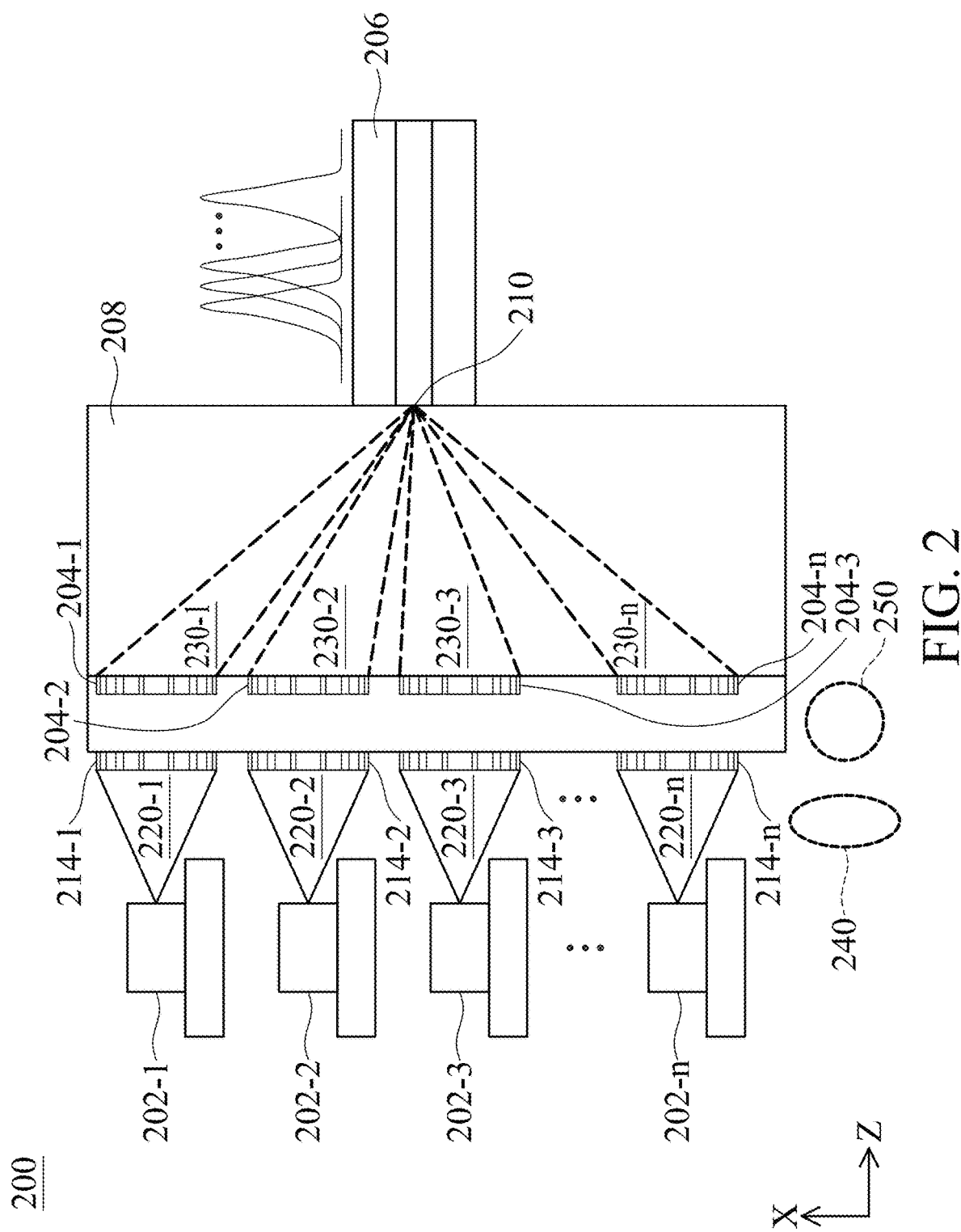
FIG. 2 is a schematic diagram of an optical communication device 200 in accordance with some embodiments of the disclosure.

FIG. 2 is a schematic diagram of an optical communication device 200 in accordance with some embodiments of the disclosure. As shown in FIG. 2, the optical communication device 200 includes a plurality of laser sources (such as laser sources 202-1, 202-2, 202-3, . . . , 1202-n), a plurality of first meta-lenses (such as meta-lens 204-1, 204-2, 204-3, . . . , 204-n), a plurality of second meta-lenses (such as meta-lens 214-1, 214-2, 214-3, . . . , 214-n), a substrate 208, and an optical fiber 206. The laser source 202-1 transmits a laser beam 220-1 with a wavelength $\lambda_1$ to the meta-lens 214-1, the laser source 202-2 transmits a laser beam 220-2 with a wavelength $\lambda_2$ to the meta-lens 214-2, the laser source 202-3 transmits a laser beam 220-3 with a wavelength $\lambda_3$ to the meta-lens 214-3, and the laser source 202-n transmits a laser beam 220-n with a wavelength to the meta-lens 214-n. In some embodiments, n is equal to 40.

In some embodiments, the meta-lens 214-1, 214-2, 214-3, . . . , 214-n are arranged between the laser sources 202-1, 202-2, 202-3, . . . , 202-n and the meta-lens 204-1, 204-2, 2104-3, . . . , 204-n. The meta-lens 214-1 receives and refracts the laser beam 220-1 with a wavelength $\lambda_1$, so that the beam profile of the laser beam 220-1 change from an oval to a circle (such as from a beam profile 240 to a beam profile 250). Similarly, the meta-lens 214-2 receives and refracts the laser beam 220-2 with a wavelength $\lambda_2$, so that the beam profile of the laser beam 220-2 changes from an oval to a circle. The meta-lens 214-3 receives and refracts the laser beam 220-3 with a wavelength $\lambda_3$, so that the beam profile of the laser beam 220-3 changes from an oval to a circle. The meta-lens 214-n receives and refracts the laser beam 220-n with a wavelength $\lambda_3$, so that the beam profile of the laser beam 220-n changes from an oval to a circle.

After that, the meta-lens 204-1 refracts the laser beam 220-1 to form a focus laser beam 230-1 to a focal point 210 in the substrate 208. Similarly, the meta-lens 204-2 refracts the laser beam 220-2 to form a focus laser beam 230-2 to the focal point 210 in the substrate 208. The meta-lens 204-3 refracts the laser beam 220-3 to form a focus laser beam 230-3 to the focal point 210 in the substrate 208. The meta-lens 204-n refracts the laser beam 220-n to form a focus laser beam 230-n to the focal point 210 in the substrate 208. Similar to the focal point 110 in FIG. 1, the focal point 210 is arranged at the input end of the optical fiber 206, so that the mixed laser beam can be transmitted in the optical fiber 206.

Figure 3:
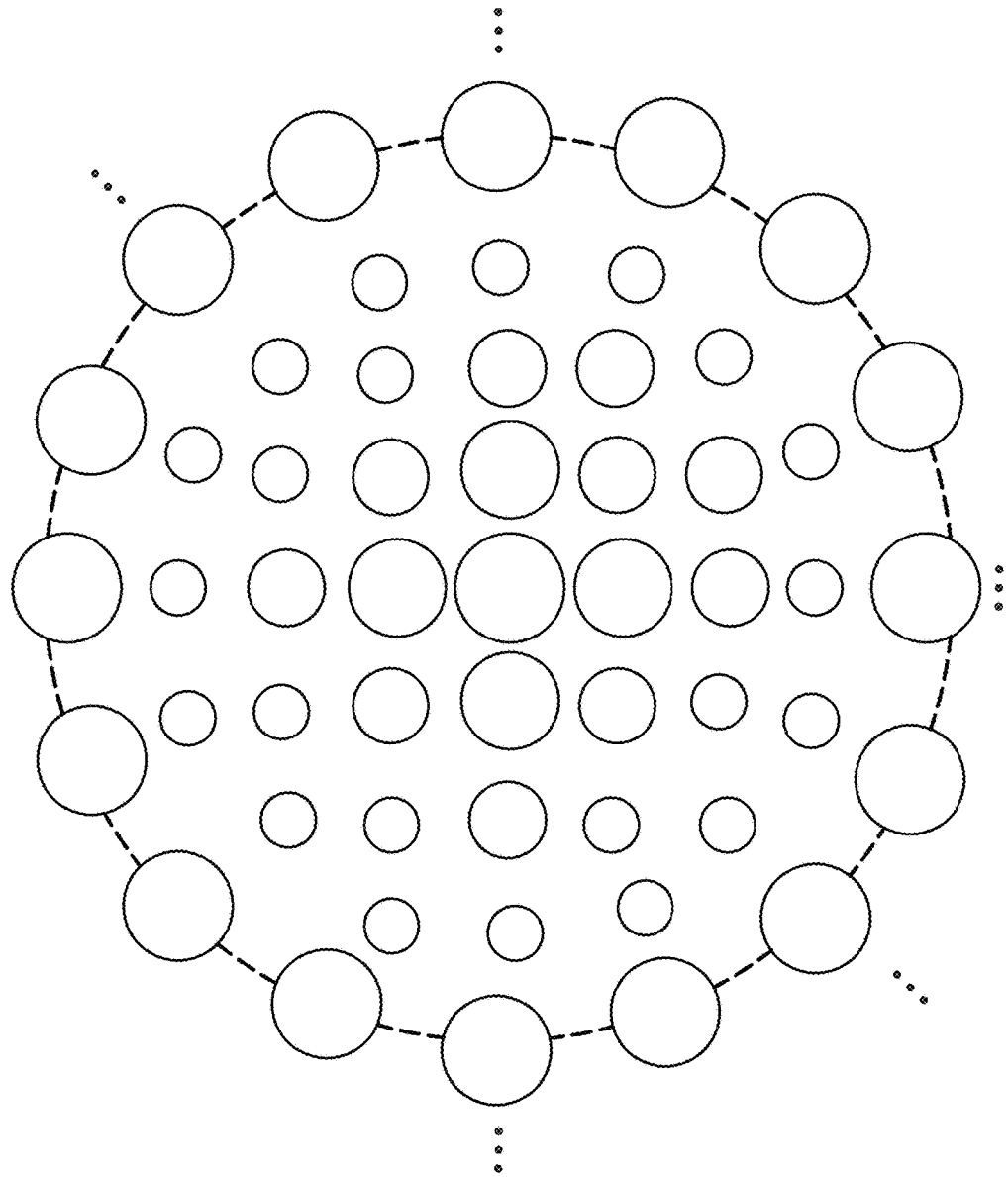
FIG. 3 is a schematic diagram of a meta-lens in accordance with some embodiments of the disclosure.

FIG. 3 is a schematic diagram of a meta-lens (for example, the meta-lens 104-1) in accordance with some embodiments of the disclosure. As shown in FIG. 3, each of the meta-lens 104-1, 104-2, 104-3, . . . , 104-n, 204-1, 204-2, 204-3, . . . , 204-n, 214-1, 214-2, 214-3, . . . , 214-n includes a plurality of cylinders with different diameters. The cylinders are arranged irregularly along the x direction and the y direction. For example, in FIG. 3, the cylinders are placed in a radial arrangement. The diameters and arrangement of the cylinders can be adjusted to fine-tune the refraction angles of the laser beams. Each cylinder includes a single crystal silicon, a polycrystalline silicon, an amorphous silicon, silicon nitride ($Si_3N_4$), gallium phosphide (GaP), titanium dioxide ($TiO_2$), aluminum antimonide (AlSb), aluminum arsenide (AlAs), aluminum gallium arsenide (AlGaAs), aluminum gallium indium phosphide (AlGaInP), boron phosphide (BP), zinc germanium phosphide ($ZnGeP_2$), or a combination thereof.

Figure 4:
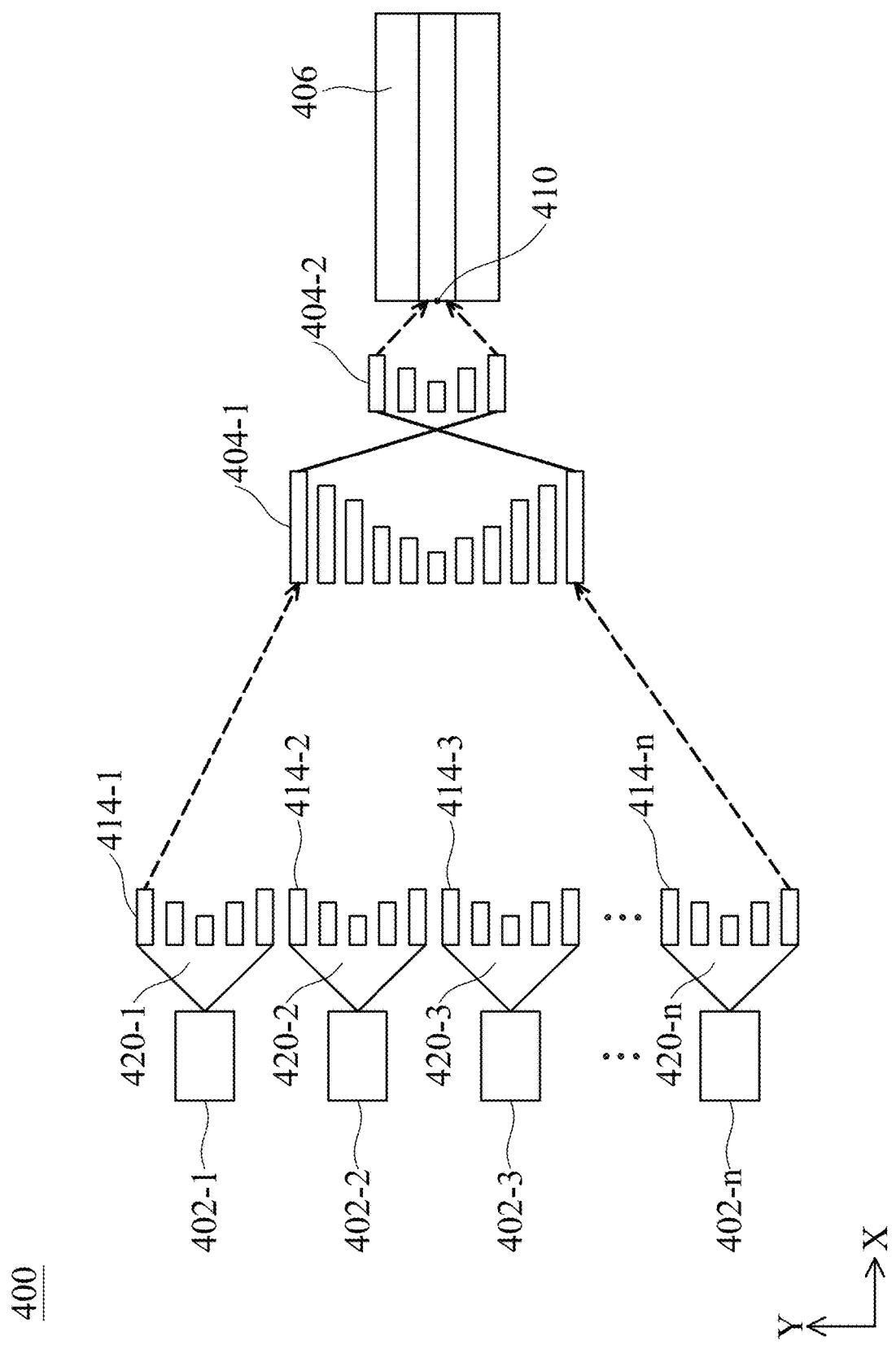
FIG. 4 is a schematic diagram of an optical communication device 400 in accordance with some embodiments of the disclosure.

FIG. 4 is a schematic diagram of an optical communication device 400 in accordance with some embodiments of the disclosure. The communication device 400 includes a plurality laser sources (such as laser sources 402-1, 402-2, 402-3, . . . , 402-n), a plurality of first meta-lenses (such as meta-lenses 404-1, 404-2), and a plurality of second meta-lenses (such as meta-lenses 414-1, 414-2, 414-3, . . . , 414-n). In some embodiments, laser sources 402-1, 402-2, 402-3, . . . , 402-n, the meta-lenses 404-1, 404-2, and the meta-lenses 414-1, 414-2, 414-3, . . . , 414-n are all formed on a common substrate (not shown) by semiconductor processes. That is, FIG. 4 is a top view of the communication device 400.

The laser source 402-1 transmits a laser beam 420-1 with a wavelength $\lambda_1$ to the meta-lens 414-1, the meta-lens 414-1 receives and refracts the laser beam 420-1, so that the beam profile of the laser beam 420-1 changes from an oval to a circle. Similarly, the laser source 402-2 transmits a laser beam 420-2 with a wavelength $\lambda_2$ to the meta-lens 414-2, the meta-lens 414-2 receives and refracts the laser beam 420-2, so that the beam profile of the laser beam 420-2 changes from an oval to a circle. The laser source 402-3 transmits a laser beam 420-3 with a wavelength $\lambda_3$ to the meta-lens 414-3, the meta-lens 414-3 receives and refracts the laser beam 420-3, so that the beam profile of the laser beam 420-3 changes from an oval to a circle. The laser source 402-n transmits a laser beam 420-n with a wavelength $\lambda_n$ to the meta-lens 414-n, the meta-lens 414-n receives and refracts the laser beam 420-n, so that the beam profile of the laser beam 420-n changes from an oval to a circle. After that, the laser beams 420-1, 420-2, 420-3, . . . , 420-n propagate to the meta-lenses 404-1 and 404-2 for focusing, so that they are all refracted to a focal point 410 to form a mixed laser beam. The focal point 410 is arranged at the input end of the optical fiber 406, and thus the mixed laser beam can be transmitted in the optical fiber 406.

In some embodiments, the laser sources 402-1, 402-2, 402-3, . . . , 402-n and the meta-lenses 414-1, 414-2, 414-3, . . . , 414-n are arranged along the y direction. In some embodiments, each of the meta-lenses 414-1, 414-2, 414-3, . . . , 414-n, 404-1, 404-2 includes a plurality of cuboids arranged along the y direction. The distance between cuboids, as well as the length and width of each cuboid, can be adjusted to fine-tune the refraction angles of the laser beams and the beam profile of the laser beams.

Figure 5:
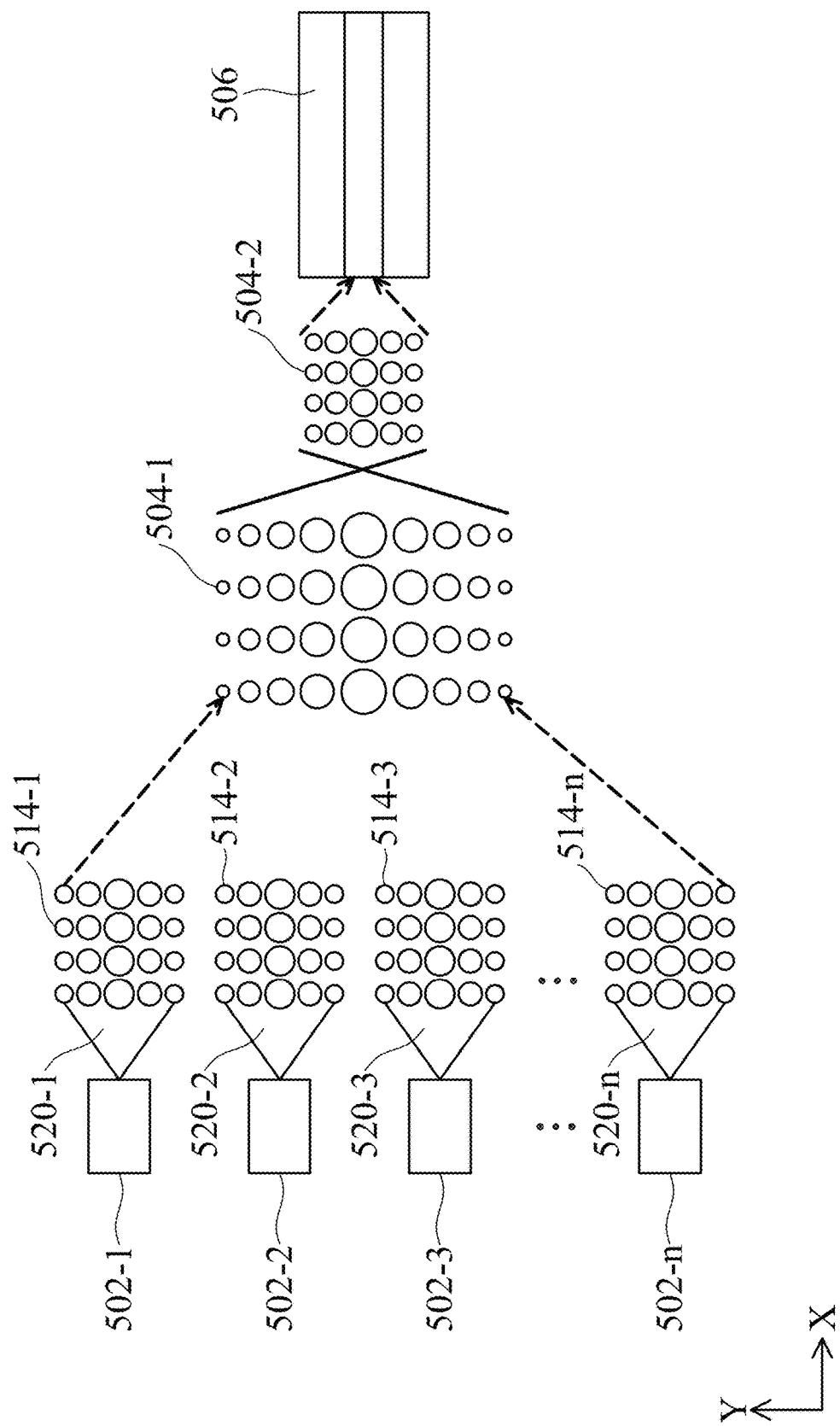
FIG. 5 is a schematic diagram of an optical communication device 500 in accordance with some embodiments of the disclosure.

FIG. 5 is a schematic diagram of an optical communication device 500 in accordance with some embodiments of the disclosure. The communication device 500 includes a plurality laser sources (such as laser sources 502-1, 502-2, 502-3, . . . , 502-n), a plurality of first meta-lenses (such as meta-lenses 504-1, 504-2), and a plurality of second meta-lenses (such as meta-lenses 514-1, 514-2, 514-3, . . . , 514-n). In some embodiments, laser sources 502-1, 502-2, 502-3, . . . , 502-n, the meta-lens 504-1, 504-2, and the meta-lens 514-1, 514-2, 514-3, . . . , 514-n are all formed on a common substrate (not shown) by semiconductor processes. That is, FIG. 5 is a top view of the communication device 500.

Similar to FIG. 4, the laser source 502-1 transmits a laser beam 520-1 with a wavelength $\lambda_1$ to the meta-lens 514-1, the meta-lens 514-1 receives and refracts the laser beam 520-1, so that the beam profile of the laser beam 520-1 changes from an oval to a circle. Similarly, the laser source 502-2 transmits a laser beam 520-2 with a wavelength $\lambda_2$ to the meta-lens 514-2, the meta-lens 514-2 receives and refracts the laser beam 520-2, so that the beam profile of the laser beam 520-2 changes from an oval to a circle. The laser source 502-3 transmits a laser beam 520-3 with a wavelength $\lambda_3$ to the meta-lens 514-3, the meta-lens 514-3 receives and refracts the laser beam 520-3, so that the beam profile of the laser beam 520-3 changes from an oval to a circle. The laser source 502-n transmits a laser beam 520-n with a wavelength $\lambda_n$ to the meta-lens 514-n, the meta-lens 514-n receives and refracts the laser beam 520-n, so that the beam profile of the laser beam 520-n changes from an oval to a circle. After that, the laser beams 520-1, 520-2, 520-3, . . . , 520-n propagate to the meta-lens 504-1, 504-2 for focusing, so that they are all refracted to a focal point 510 to form a mixed laser beam. The focal point 510 is arranged at the input end of the optical fiber 506, thus the mixed laser beam can be transmitted in the optical fiber 506.

In some embodiments, the laser sources 502-1, 502-2, 502-3, . . . , 502-n and the meta-lens 514-1, 514-2, 514-3, . . . , 514-n are arranged along the y direction. In some embodiments, each of the meta-lens 514-1, 514-2, 514-3, . . . , 514-n, 504-1, 504-2 includes a plurality of cylinders arranged along the y direction. The distance between cylinders, as well as the diameter of each cylinder, can be adjusted to fine-tune the refraction angles of the laser beams and the beam profile of the laser beams.

Figure 6:
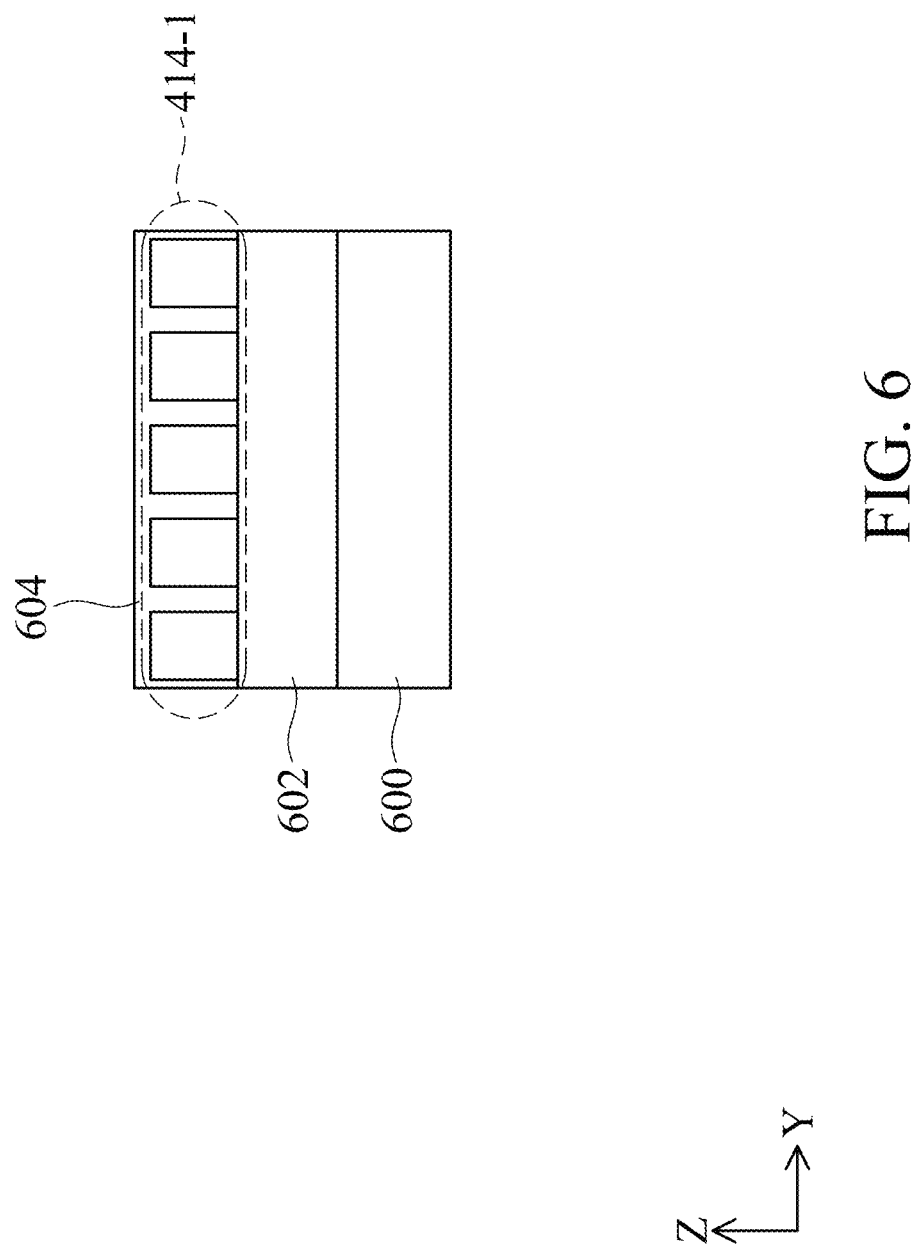
FIG. 6 is a sectional drawing of a meta-lens in FIG. 4 in accordance with some embodiments of the disclosure.

FIG. 6 is a sectional drawing of a meta-lens (for example, the meta-lens 414-1) in FIG. 4 in accordance with some embodiments of the disclosure. As shown in FIG. 6, the meta-lens 414-1 is formed on a substrate 600 (such as the common substrate) and a substrate 602. The substrate 602 is a buffer layer, and is between the meta-lens 414-1 and the substrate 600. In detailed, the meta-lens 414-1 is formed on the top surface of the substrate 602. Dielectric material 604 may be filled upon the meta-lens 414-1 to protect the cuboid structures of the meta-lens 414-1. In some embodiments, the dielectric material 604 is polymer. In some embodiments, the dielectric material 604 can also be air. The thickness of the substrate 602 can be adjusted so that the height of the laser source 402-1 is aligned with that of the meta-lens 414-1. In some embodiments, the substrate 600 includes indium phosphide (InP), gallium arsenide (GaAs), gallium nitride (GaN), sapphire, or a combination thereof.

Figure 7:
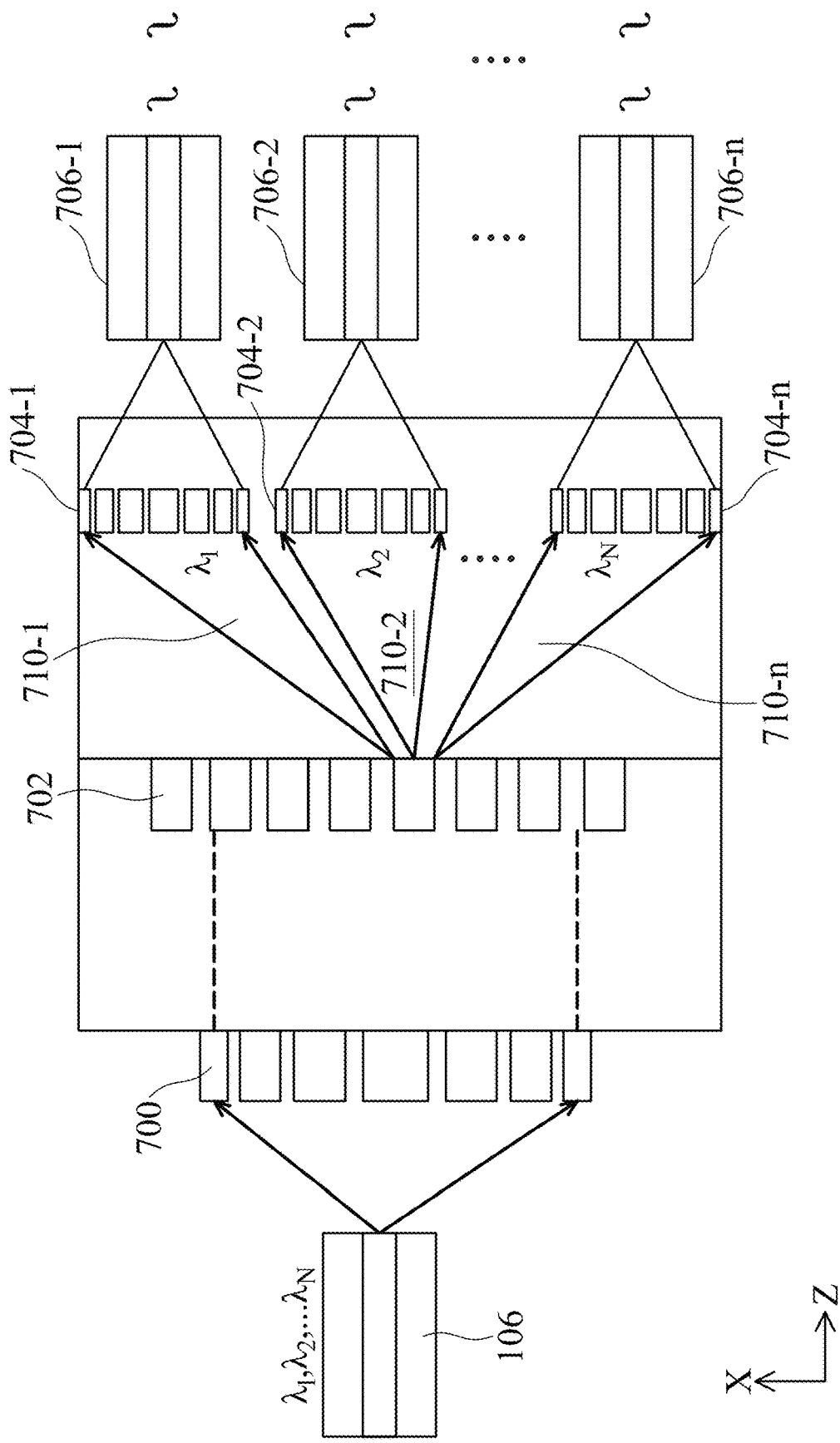
FIG. 7 is a schematic diagram of an optical communication device 100 in accordance with another embodiment of the disclosure.

FIG. 7 is a schematic diagram of the optical communication device 100 in FIG. 1 (or the optical communication device 200 in FIG. 2) in accordance with another embodiment of the disclosure. As shown in FIG. 7, the communication device 100 (or the communication device 200 in FIG. 2) further includes a meta-lens 700, a grating 702, a plurality of meta-lens (such as meta-lens 704-1, 704-2, . . . , 704-n), and a plurality optical fibers (such as optical fibers 706-1, 706-2, . . . , 706-n). The mixed laser beam is transmitted from the optical fiber 106 (or the optical fiber 206) to the meta-lens 700. The meta-lens 700 parallelizes the mixed laser beam from the optical fiber 106. After that, the grating 702 disperses the mixed laser beam to form a laser beam 710-1 with a wavelength $\lambda_1$, a laser beam 710-2 with a wavelength $\lambda_2$, . . . , and a laser beam 710-n with a wavelength $\lambda_n$. In some embodiments, n is equal to 40, but the present invention is not limited thereto.

The meta-lens 704-1 receives the laser beam 710-1 with a wavelength $\lambda_1$, and retracts and focuses the laser beam 710-1 to the optical fiber 706-1. The meta-lens 704-2 receives the laser beam 710-2 with a wavelength 2, and retracts and focuses the laser beam 710-2 to the optical fiber 706-2. The meta-lens 704-$n$ receives the laser beam 710-$n$ with a wavelength $\lambda_n$, and retracts and focuses the laser beam 710-$n$ to the optical fiber 706-$n$. In some embodiments, each of the meta-lens 700, 704-1, 704-2, . . . , 704-$n$ includes a plurality of cylinders with different diameters. The cylinders are arranged irregularly along the x direction and the y direction. In some embodiments, the grating 702 also includes a plurality of cylinders with different diameters. However, the cylinders in the grating 702 are arranged regularly along the x direction and the y direction. In some embodiments, the numerical aperture (NA) of the meta-lens 700 should match WG mode ($LP_{01}$). The distance between cylinders, as well as the diameter of each cylinder, can be adjusted to fine-tune the refraction angles of the laser beams.

Figure 8:
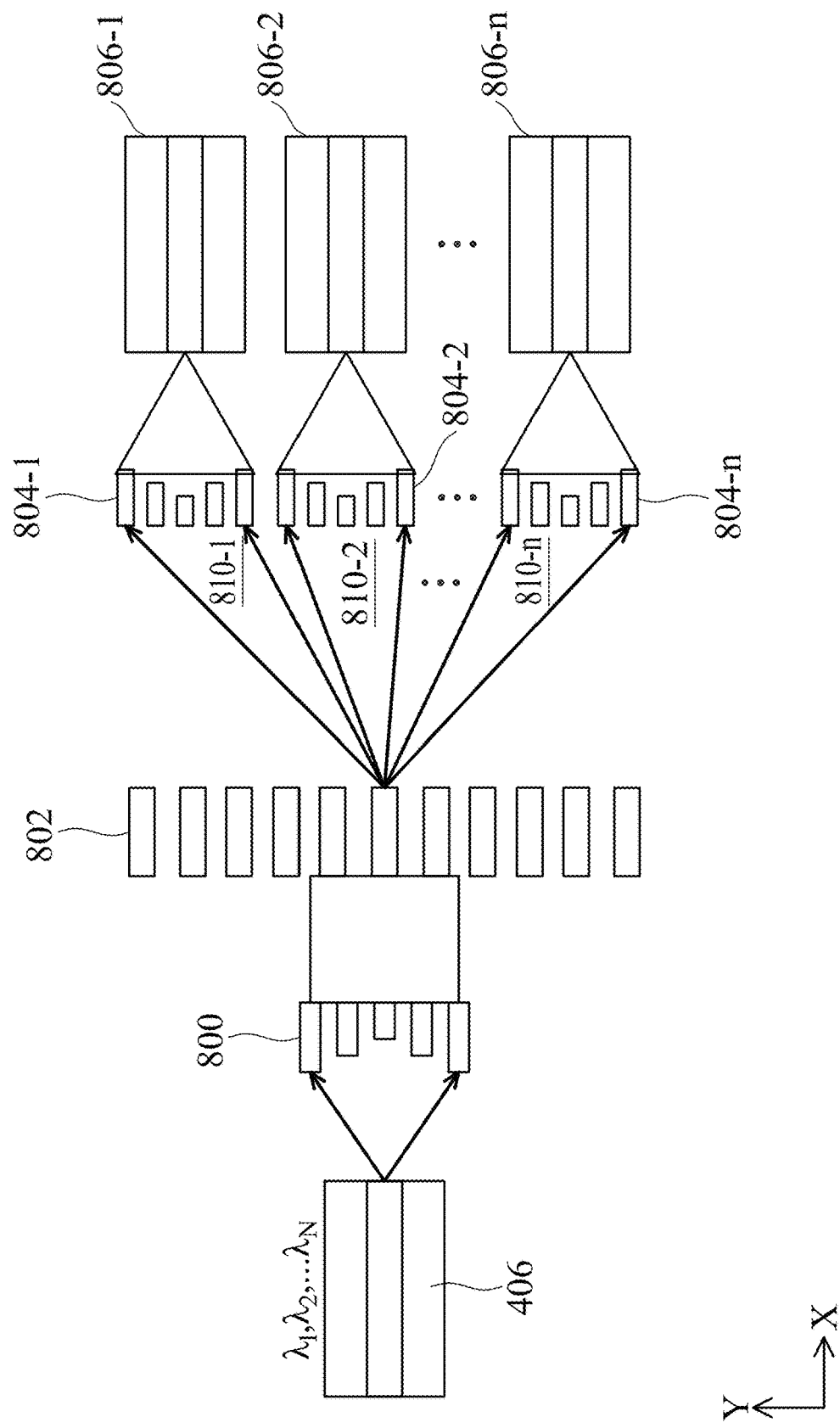
FIG. 8 is a schematic diagram of an optical communication device 400 in accordance with another embodiment of the disclosure.

FIG. 8 is a schematic diagram of an optical communication device 400 in accordance with another embodiment of the disclosure. As shown in FIG. 8, the optical communication device 400 further includes a meta-lens 800, a grating 802, a plurality of meta-lens (such as meta-lens 804-1, 804-2, . . . , 804-$n$), and a plurality optical fibers (such as optical fibers 806-1, 806-2, . . . , 806-$n$). In some embodiments, the meta-lens 800, the grating 802, and the meta-lens 804-1, 804-2, . . . , 804-$n$ are form on a common substrate (not shown) by semiconductor processes. The mixed laser beam is transmitted from the optical fiber 406 to the meta-lens 800. Similarly, the meta-lens 800 parallelizes the mixed laser beam from the optical fiber 406. After that, the grating 802 disperses the mixed laser beam to form a laser beam 810-1 with a wavelength $\lambda_1$, a laser beam 810-2 with a wavelength $\lambda_2$, . . . , and a laser beam 810-$n$ with a wavelength $\lambda_n$.

The meta-lens 804-1 receives the laser beam 810-1 with a wavelength $\lambda_1$, and retracts and focuses the laser beam 810-1 to the optical fiber 806-1. The meta-lens 804-2 receives the laser beam 810-2 with a wavelength $\lambda_2$, and retracts and focuses the laser beam 810-2 to the optical fiber 806-2. The meta-lens 804-$n$ receives the laser beam 810-$n$ with a wavelength $\lambda_n$, and retracts and focuses the laser beam 810-$n$ to the optical fiber 806-$n$. In some embodiments, each of the meta-lens 800, 804-1, 804-2, . . . , 804-$n$ includes a plurality of cuboids. The cuboids are arranged irregularly along the y direction. The grating 802 also includes a plurality of cuboids. However, the cuboids in the grating 802 are arranged regularly along the y direction. The distance between cuboids, as well as the length and width of each cuboid, can be adjusted to fine-tune the refraction angles of the laser beams.

In some embodiments, the laser sources and meta-lenses in FIG. 4 and FIG. 5, and the laser sources, meta-lenses, and grating in FIG. 8 can be built in an integrated circuit (for example, a chip or an SoC, so that each laser source can be easily and accurately aligned to a meta-lens, and the size of the optical communication system can be reduced.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:

1. An optical communication device, comprising:
   a plurality of laser sources, transmitting a plurality of laser beams in the same direction according to electrical signals; wherein the laser beams have different wavelengths;
   a plurality of first meta-lenses, receiving the laser beams, and in a first substrate, refracting the laser beams to a focal point to generate a mixed laser beam;
   an optical fiber, receiving the mixed laser beam for transmission; wherein the focal point is arranged at the input end of the optical fiber,
   wherein each of the first meta-lenses is designed individually, so that the refraction angles of the laser beams passing through the first meta-lenses will match the numerical aperture (NA) of the optical fiber.

2. The optical communication device as claimed in claim 1, further comprising:
   a plurality of second meta-lenses, arranged between the laser sources and the first meta-lenses;
   wherein the second meta-lenses refract the laser beams, so that beam profiles of the laser beams change from an oval to a circle.

3. The optical communication device as claimed in claim 2, wherein each first and second meta-lens comprises a plurality of cylinders with different diameters.

4. The optical communication device as claimed in claim 3, wherein the distance between the first meta-lenses and the optical fiber is greater than the diameters of the first meta-lenses.

5. The optical communication device as claimed in claim 2, wherein the laser sources and the first and second meta-lenses are formed on a second substrate; the first and second meta-lenses are formed on the top surface of a buffer layer; and the buffer layer is between the first and second meta-lenses and the second substrate.

6. The optical communication device as claimed in claim 5, wherein the thickness of the buffer layer can be adjusted, so that the height of the laser sources is aligned with that of the first and second meta-lenses.

7. The optical communication device as claimed in claim 5, wherein the first substrate comprises a glass, and the second substrate comprises indium phosphide (InP), gallium arsenide (GaAs), gallium nitride (GaN), or sapphire.

8. The optical communication device as claimed in claim 1, wherein the wavelengths of the laser beams are between 1530 nanometers and 1565 nanometers.

9. The optical communication device as claimed in claim 1, wherein the distance between the first meta-lenses and the optical fiber is equal to the thickness of the first substrate.

10. The optical communication device as claimed in claim 1, wherein the mixed laser beam is transmitted in a single-mode in the optical fiber.

11. The optical communication device as claimed in claim 1, further comprising:
    a third meta-lens, receiving the mixed laser beam from the optical fiber, and parallelizing the mixed laser beam;
    a grating, dispersing the mixed laser beam to recover the laser beams with different wavelengths;
    a plurality of fourth meta-lenses, receiving the laser beams, and refracting and focusing the laser beams to a plurality of second optical fibers; wherein the second optical fibers receive the respective laser beams with different wavelengths.

12. The optical communication device as claimed in claim 11, wherein each of the fourth meta-lenses is designed individually, so that the refraction angles of the laser beams passing through the fourth meta-lenses can match the numerical aperture (NA) of the second optical fibers.

13. The optical communication device as claimed in claim 11, wherein the first, second and fourth meta-lenses, the third meta-lens, and the grating comprise a single crystal silicon, a polycrystalline silicon, an amorphous silicon, silicon nitride ($Si_3N_4$), gallium phosphide (GaP), titanium dioxide ($TiO_2$), aluminum antimonide (AlSb), aluminum arsenide (AlAs), aluminum gallium arsenide (AlGaAs), aluminum gallium indium phosphide (AlGaInP), boron phosphide (BP), or zinc germanium phosphide ($ZnGeP_2$).

14. The optical communication device as claimed in claim 1, wherein the laser sources are semiconductor lasers.

* * * * *